(12) United States Patent
Lee

(10) Patent No.: US 6,868,750 B2
(45) Date of Patent: Mar. 22, 2005

(54) TELESCOPIC DEVICE OF STEERING COLUMN FOR VEHICLE

(75) Inventor: Byeong-Hoon Lee, Kyunggi-do (KR)

(73) Assignee: Hyundai Mobis Co., Ltd., Kyunggi-do (KR)

( * ) Notice: Subject to any disclaimer, the term of this patent is extended or adjusted under 35 U.S.C. 154(b) by 72 days.

(21) Appl. No.: 10/241,506

(22) Filed: Sep. 12, 2002

(65) Prior Publication Data

US 2003/0094062 A1 May 22, 2003

(30) Foreign Application Priority Data

Nov. 21, 2001 (KR) .......................................... 2001-35877
Jan. 4, 2002 (KR) ............................................. 2002-517

(51) Int. Cl.[7] ................................................ B62D 1/18
(52) U.S. Cl. ........................................ 74/493; 280/775
(58) Field of Search ............................. 74/493; 280/775

(56) References Cited

U.S. PATENT DOCUMENTS

| 3,491,614 A | * | 1/1970 | Demske et al. ................ 74/493 |
| 3,570,322 A | * | 3/1971 | Krouse ......................... 74/493 |
| 4,709,592 A | * | 12/1987 | Andersson .................... 74/493 |
| 5,009,120 A | * | 4/1991 | Iseler et al. ................... 74/493 |
| 6,467,367 B2 | * | 10/2002 | Kim et al. ..................... 74/493 |
| 2003/0005787 A1 | * | 1/2003 | Schulz et al. ................. 74/493 |

* cited by examiner

Primary Examiner—William C. Joyce
(74) Attorney, Agent, or Firm—Greenblum & Bernstein, P.L.C.

(57) ABSTRACT

A telescopic device of a steering column for a vehicle, in which a telescopic inner member is slidable or fixable on a telescopic outer member by selectively pivoting a telescopic lever, includes a plurality of locking blocks that are received in one of a plurality of block cases formed along the outer surface of the telescopic outer member and selectively providing a fixing force to the telescopic inner member by movement along inclined bottom surfaces of said block cases and a fastening member having one end pivotally attached to one end of a connection rod.

10 Claims, 3 Drawing Sheets

TELESCOPIC DEVICE OF STEERING COLUMN FOR VEHICLE

BACKGROUND OF THE INVENTION

1. Field of the Invention

The present invention relates to a telescopic device of a steering column for a vehicle, more particularly to a telescopic device of a steering column for a vehicle, in which a plurality of locking blocks are installed for providing fixing force between a telescopic outer member and a telescopic inner member, wherein the fixing force of each locking block can be equally distributed.

2. Description of the Related Art

Generally, the telescopic device is used for adjusting the length of a steering wheel according to the body type of a driver.

Referring to FIGS. 1 and 2, a typical telescopic device 100 includes a locking block 104 contacting with a telescopic inner member 112, and a tapered block 106 coupled with an operating lever 108 stacked within a block case 102 formed at the bottom side of a telescopic outer member 110.

When the tapered block 106 is moved along an inclined bottom surface of the block case 102 according to the pivot of the operating lever 108, the locking block 104 is moved vertically to selectively provide fixing force to the telescopic inner member 112 so as to make the telescopic inner member 112 closely contact and become fixed on the telescopic outer member 110 or to slide on the telescopic outer member, thereby adjusting the length of a steering shaft 114 coupled with a steering wheel (not shown) on a tip end.

The telescopic device 100 as stated above, however, is installed at a specific upper position of the steering shaft 114 adjacent to the steering wheel so as to enable a driver to easily manipulate the telescopic device, so the fixing force provided by the telescopic device 100 is hardly transmitted to the lower part of the steering shaft 114, which results in a reduction of the coupling force between the lower parts of the telescopic inner member 112 and the telescopic outer member, 110 as well as the generation of noise by the vibration due to an expanded gap.

In addition, the gap between the telescopic inner member 112 and the telescopic outer member 110 is adjusted to be reduce so as to complement the limited fixing force, but even so it results in a rise in the cost of production and the number of defective products due to the precise process of forming the mating diameter surfaces of the telescopic inner member 112 and the telescopic outer member 110, and the reliability of the product deteriorates due to the poor operation depending on the reduction of the gap.

SUMMARY OF THE INVENTION

It is, therefore, an object of the present invention to provide a telescopic device of a steering column for a vehicle, wherein a plurality of locking blocks are installed so as to provide fixing force of an telescopic outer member and an telescopic inner member at several positions, and the locking blocks are connected by a connection rod so that they have equal fixing force relative to the pivot of an operating lever, thereby achieving stability and quietness of a product, in addition to reliability of the product.

To achieve the above object, there is provided a telescopic device of a steering column for a vehicle, in which a telescopic inner member is slid or fixed on a telescopic outer member by selectively pivoting a telescopic lever, including a plurality of locking blocks received in a plurality of block cases formed on the telescopic outer member, for selectively providing a fixing force to the telescopic inner member, as moving along a inclined bottom surfaces of the block cases; and a fastening member having one end pivotally attached to one end of a connection rod for inter-connecting the locking blocks to contact with the locking block on an outer circumferential surface, and the other end of the fastening member is attached to one end of the telescopic lever.

The fastening member has a cam shape capable of varying a space between the locking blocks by moving the locking blocks in opposite directions according to a variation of contacting region between the curved outer circumferential surface of the fastening member and the locking block while the fastening member is pivoted synchronously with the pivot of the telescopic lever.

The telescopic device further includes an elastic member inserted between the block case and the locking block so as to enable the displacement of the locking block to be rapidly performed according to the pivot of the telescopic lever.

The locking block is a hexahedron or a circular shape in order to be able to provide the fixing force to the telescopic inner member, while being moved along the inclined bottom surface of the block case.

According to another aspect of the present invention, a telescopic device of a steering column for a vehicle is provided that includes a telescopic inner member slidably mounted on a telescopic outer member and selectively fixable thereto by pivoting a telescopic lever. The telescopic device includes a plurality of block cases formed on the telescopic outer member, with the block cases including inclined bottom surfaces, a plurality of locking blocks, each locking block received in a respective one of the block cases, and an actuating mechanism configured to interconnect the locking blocks such that the locking blocks are simultaneously movable toward and away from each other to selectively engage and disengage an outer circumferential surface of the telescopic inner member so that the telescopic inner member and the telescopic outer member are selectively locked and unlocked relative to one another.

In a further aspect of the present invention, the actuating mechanism of the telescopic device may include a connection rod that inter-connects the locking blocks, and a fastening member having a portion pivotally attached to one end of the connection rod and another portion is fixed to the telescopic lever, whereby operation of the telescopic lever causes the fastening member to move the locking blocks toward and away from one another to cause the locking blocks selectively engage and disengage from an outer circumferential surface of the telescopic inner member. Furthermore, the locking blocks are moveable along the inclined bottom surfaces of the block cases to cause the locking blocks to selectively engage and disengage the outer circumferential surface of the telescopic inner member.

In still further aspects of the present invention, the telescopic device the fastening member of the telescopic device may have a cam shape capable of varying a space between the locking blocks by moving the locking blocks in opposite directions according to a variation of contacting region between the curved outer circumferential surface of the fastening member and one of the locking blocks while the fastening member pivots synchronously with the pivot of the telescopic lever. Additionally, an elastic member may be inserted between at least one block case and a respective locking block so as to enable the displacement of the locking block to be rapidly performed according to the operation of the telescopic lever. Moreover, the locking blocks may have one of a hexahedron shape and a circular shape in order to be able to provide the fixing force to the telescopic inner member, while being moved along the inclined bottom surfaces of the block case.

BRIEF DESCRIPTION OF THE DRAWINGS

The above objects, features and advantages of the present invention will become more apparent from the following detailed description when taken in conjunction with the accompanying drawings, in which.

DETAILED DESCRIPTION OF THE PREFERRED EMBODIMENT

A telescopic device of a steering column for a vehicle according to an embodiment of the present invention will now be described with reference to the accompanying drawings.

Figure 1:
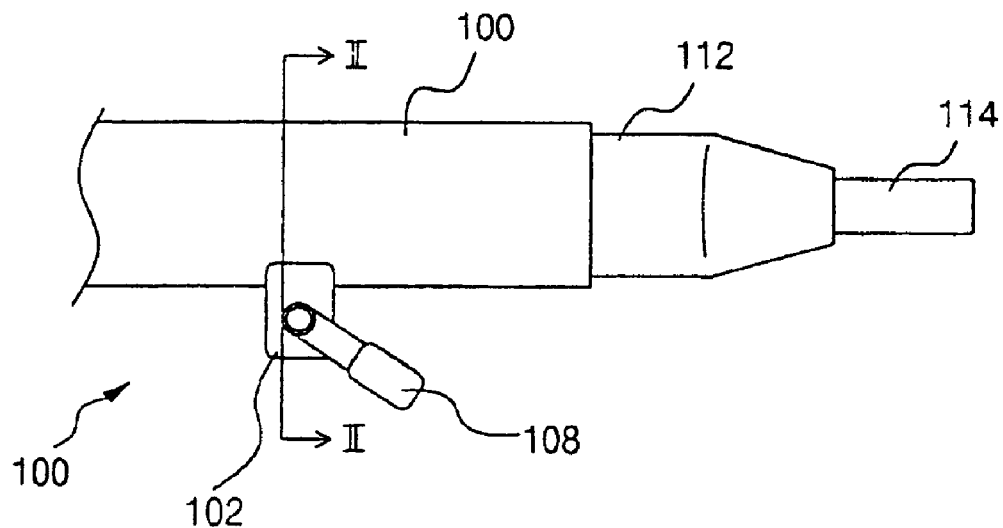
FIG. 1 is a side view illustrating a typical telescopic device.
Figure 2:
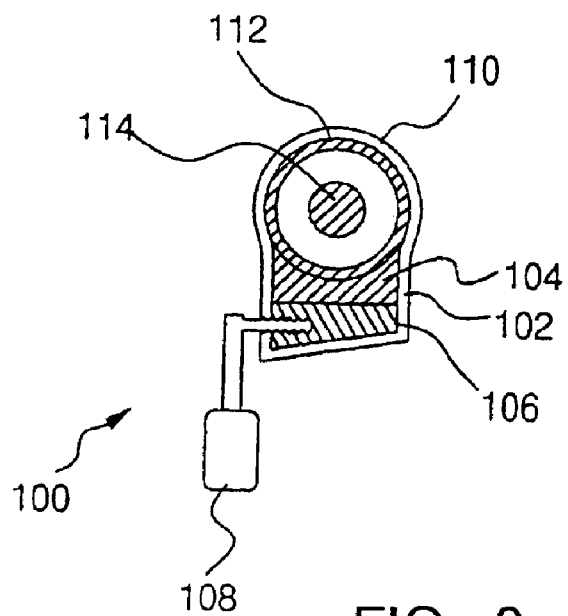
FIG. 2 is a cross sectional view taken on the line II—II in FIG. 1.
Figure 3:
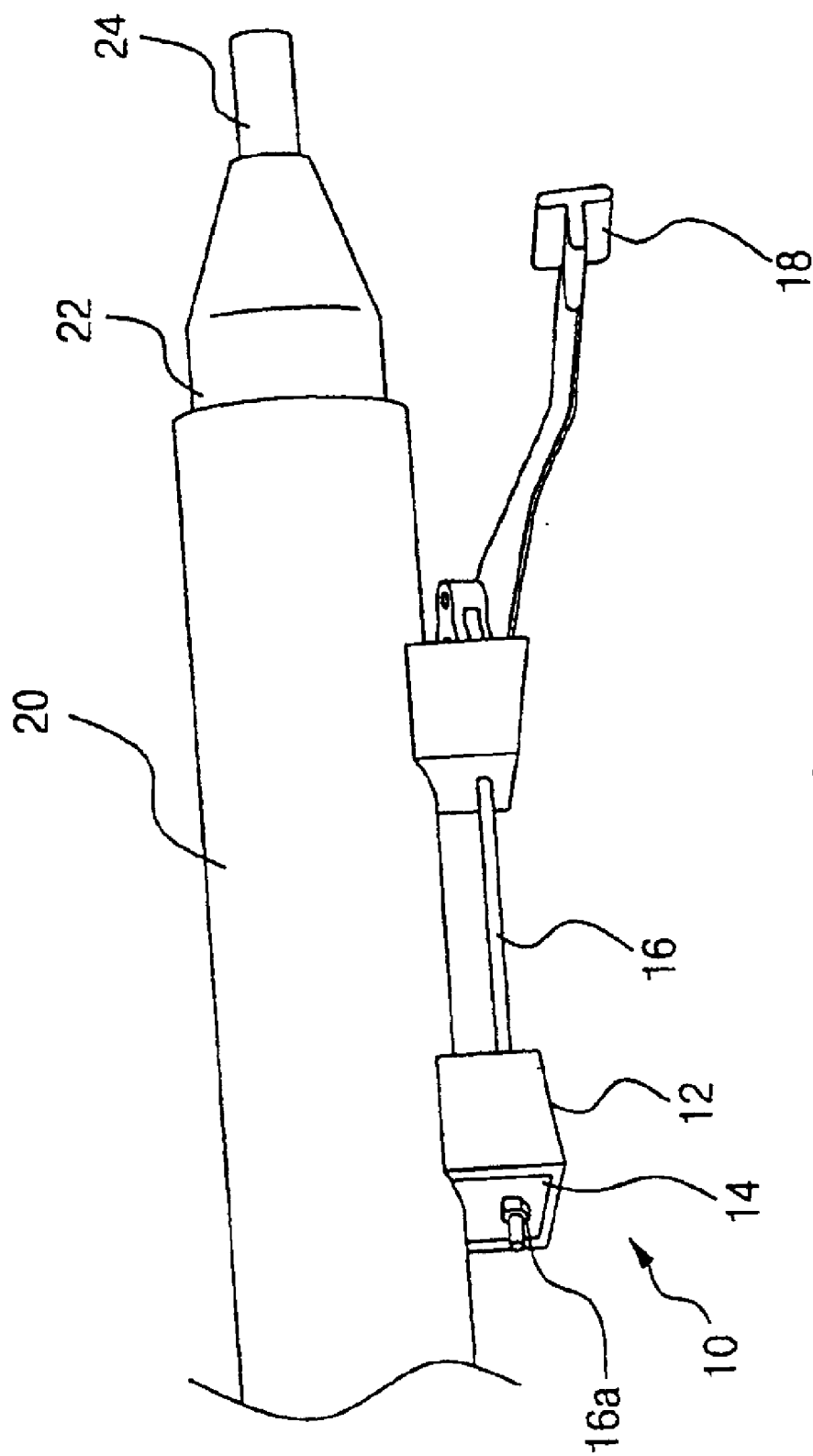
FIG. 3 is a diagrammatic perspective view illustrating a telescopic device according to a preferred embodiment of the present invention.
Figure 4:
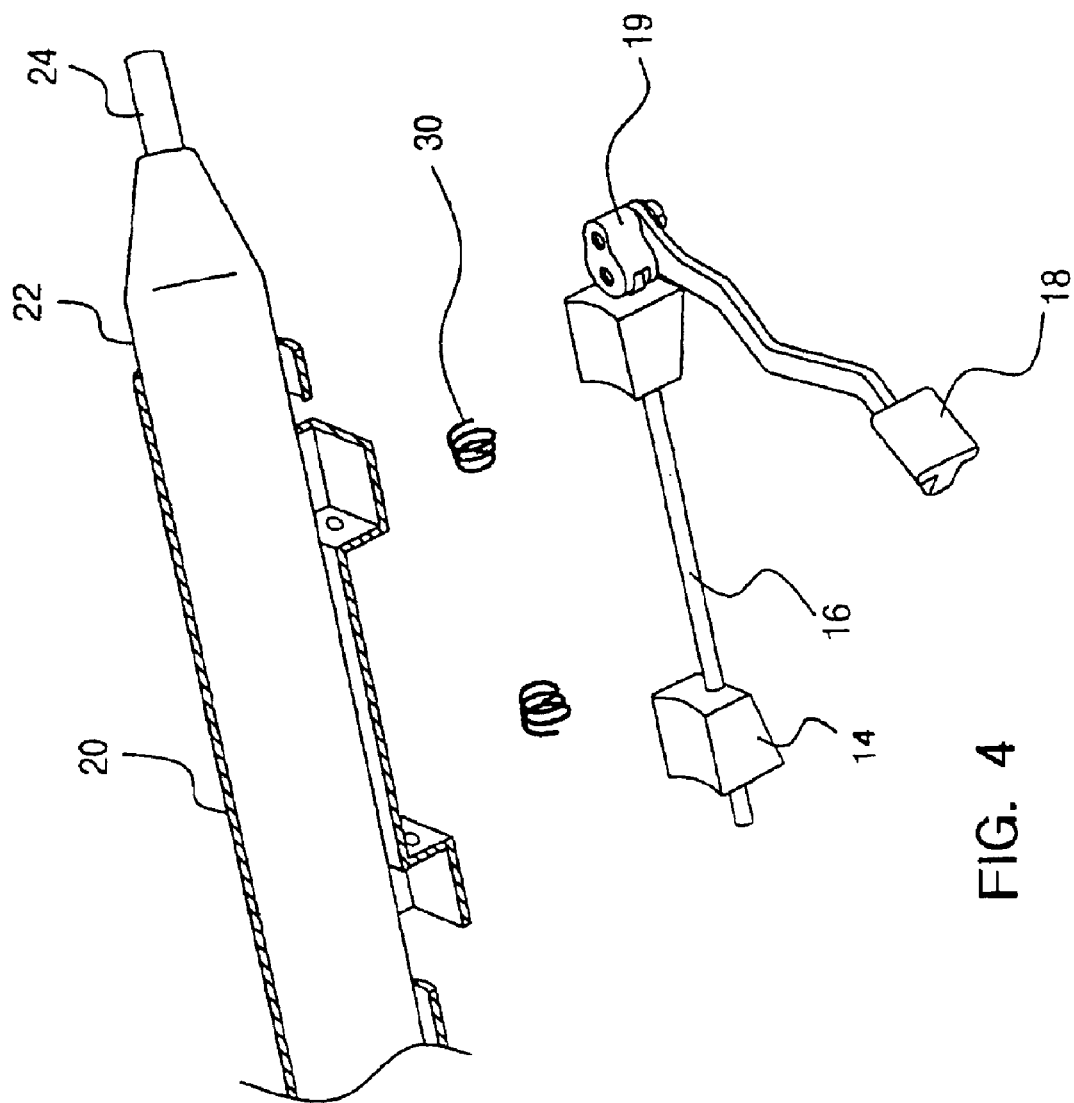
FIG. 4 is a cross sectional view taken on the line IV—IV in FIG. 3.

FIG. 3 is a diagrammatic perspective view illustrating the telescopic device according to an embodiment of the present invention, and FIG. 4 is a cross sectional view taken on the line IV—IV in FIG. 3.

As shown in FIGS. 3 and 4, the telescopic device 10 according to the present invention includes a plurality of locking blocks 14 received in block cases 12 formed on a telescopic outer member 20, a connection rod 16 for interconnecting the locking blocks 14 each other so as to regulate the movement of the locking blocks 14, and a fastening member 19 having one end attached to one end of a telescopic lever 18 and the other end is attached to one end of the connection rod 16 to contact with one of the locking blocks 14 so as to enable the locking blocks 14 to be reciprocated along an inclined bottom surface of the block cases by the pivot of the telescopic lever 18.

The telescopic outer member 20 is provided with the block cases 12 facing each other with an appropriate space therebetween, and the block cases 12 are provided with the inclined bottom surfaces descending away from each other. The locking blocks 14 are received in the block cases 12 so that they can push the outer circumferential surface of a telescopic inner member 22 upwardly while reciprocating along the inclined bottom surfaces in opposite directions so as to make the telescopic inner member 22 closely contact the telescopic outer member 20 member.

The connection rod 16, which is attached to the locking blocks 14 so as to penetrate them, also serves to secure the position of the locking blocks 14 within the block case 12. The one end of the connection rod 16 is pivotally attached to the fastening member 19 as described above, and additionally the other end of the connection rod 16 is attached to an adjustable stop member 16a, for example, a nut threaded on the end of the connection rod 16. The locking blocks 14 are positioned between the stop member 16a and the fastening member 19 to contact them so as to regulate the moving distance of the locking blocks 14.

The fastening member 19 has a cam shape having a long axis and a short axis, and a part of the outer circumferential surface thereof is in contact with one of the locking blocks 14 so as to be fastened to the one end of the connection rod 16. Thereby, since a contacting region between the fastening member 19 and the locking block 14 is changed according to the curved portions of the long axis and the short axis while the fastening member 19 is pivoted, the space between the locking blocks 14 can be adjusted. In addition, the pivot of the fastening member 19 depends on the telescopic lever 18 attached to the one end thereof.

In addition, the telescopic device 10 includes an elastic member 30 to be positioned between the inner walls of the locking block 14 and the block case 12 so that it can rapidly respond to the space variation between the locking blocks 14 according to the pivot of the fastening member 19.

The elastic member 30 is preferably a disc spring, or a coiled spring, or the like.

In addition, the telescopic device 10 is used for selectively providing a fixing force to the telescopic inner member 22 while the locking blocks 14 move along the inclined bottom surfaces of the block cases 12. The shape of the locking block 14 received in the block case 12 can be selected into various shapes including a circular shape a dihedron, a trihedron, a tetrahedron, a pentahedron, a hexahedron, and so on except its upper surface having a same curvature as the telescopic inner member 22.

The operation of the telescopic device according to the present invention constituted as stated above will be described below.

When the telescopic lever 18 is rotated, the fastening member 19 is rotated about the one end of the connection rod 16, and then the locking blocks 14, contacting with the fastening member 19 variably in correspondence to the length variation of the long axis/the short axis, are reciprocated along the inclined bottom surfaces of the block cases 12 in opposite directions so as to selectively provide the desired fixing force to the telescopic inner member 22 upwardly, thereby the telescopic inner member 22 can closely contact the telescopic outer member 20 or can be drawn/inserted from/to the telescopic outer member 20 in order to be able to readily adjust the length of a steering shaft 24 according to the convenience of a driver.

The effect of the present invention configured as stated above will now be described.

Since the locking blocks received in the block cases formed on the telescopic outer member provide the fixing force to the telescopic inner member at positions so as to stably secure the telescopic inner member to the telescopic outer member, it is therefore possible to completely eliminate noise caused by the vibration due to the unstable fixing structure of the typical telescopic device, to eliminate the necessity of accurate processing, and to prevent the poor operation, thus improving the reliability of a product.

While the invention has been shown and described with reference to certain preferred embodiments thereof, it will be understood by those skilled in the art that various changes in form and details may be made therein without departing from the spirit and scope of the invention as defined by the appended claims.

Although the invention has been described with reference to an exemplary embodiment, it is understood that the words that have been used are words of description and illustration, rather than words of limitation. Changes may be made, within the purview of the appended claims, as presently stated and as amended, without departing from the scope and spirit of the present invention in its aspects. Although the invention has been described herein with reference to particular means, materials and embodiments, the invention is not intended to be limited to the particulars disclosed herein. Instead, the invention extends to all functionally equivalent structures, methods and uses, such as are within the scope of the appended claims.

The present application claims priority under 35 U.S.C. § 119 of Korean (Republic of Korea) Patent Application No. KR 2001-35877, filed on Nov. 21, 2001, and Korean (Republic of Korea) Patent Application No. KR 2002-517, filed on Jan. 4, 2002, and the disclosures of which are expressly incorporated by reference herein their entireties.

What is claimed is:

1. A telescopic device of a steering column for a vehicle, in which a telescopic inner member is slidable or fixable on a telescopic outer member by selectively pivoting a telescopic lever, said telescopic device comprising:
   a plurality of locking blocks, each said locking block received in one of a plurality of block cases formed at longitudinally spaced locations along the outer surface of said telescopic outer member, said locking blocks selectively providing a fixing force to said telescopic inner member by movement along inclined bottom surfaces of said block cases; and
   a fastening member having one end pivotally attached to one end of a connection rod that inter-connects said locking blocks to contact said locking blocks on an outer circumferential surface of said telescopic inner member, and the other end is attached to one end of said telescopic lever.

2. The telescopic device of claim 1, further comprising an elastic member inserted between at least one block case and a respective locking block so as to enable the displacement of said locking block to be rapidly performed according to the rotation of said telescopic lever.

3. The telescopic device of claim 1, wherein said locking blocks have one of a hexahedron shape and a circular shape in order to be able to provide the fixing force to the telescopic inner member, while being moved along the inclined bottom surface of the block case.

4. A telescopic device of a steering column for a vehicle, in which a telescopic inner member is slidable or fixable on a telescopic outer member by selectively pivoting a telescopic lever, said telescopic device comprising:
   a plurality of locking blocks, each said locking block received in one of a plurality of block cases formed on said telescopic outer member, said locking blocks selectively providing a fixing force to said telescopic inner member by movement along inclined bottom surfaces of said block cases; and
   a fastening member having one end pivotally attached to one end of a connection rod that inter-connects said locking blocks to contact said locking blocks on an outer circumferential surface of said telescopic inner member, and the other end is attached to one end of said telescopic lever,
   wherein said fastening member has a cam shape capable of varying a space between said locking blocks by moving said locking blocks in opposite directions according to a variation of contacting region between the curved outer circumferential surface of said fastening member and one of said locking blocks while the fastening member is pivoting synchronously with the pivot of said telescopic lever.

5. A telescopic device of a steering column for a vehicle, including a telescopic inner member is slidably mounted on a telescopic outer member and selectively fixable thereto by pivoting a telescopic lever, said telescopic device comprising:
   a plurality of block cases formed on said telescopic outer member, said block cases including inclined bottom surfaces;
   a plurality of locking blocks, each said locking block received in a respective one of said block cases formed at longitudinally spaced locations along the outer surface of said telescopic outer member; and
   an actuating mechanism configured to interconnect said locking blocks such that said locking blocks are simultaneously movable toward and away from each other to selectively engage and disengage an outer circumferential surface of said telescopic inner member so that said telescopic inner member and said telescopic outer member are selectively locked and unlocked relative to one another.

6. The telescopic device of claim 5, wherein said actuating mechanism comprises a connection rod that inter-connects said locking blocks, and a fastening member having a portion pivotally attached to one end of said connection rod and another portion is fixed to said telescopic lever, whereby operation of said telescopic lever causes said fastening member to move said locking blocks toward and away from one another to cause said locking blocks selectively engage and disengage from an outer circumferential surface of said telescopic inner member.

7. The telescopic device of claim 5, wherein said locking blocks are moveable along said inclined bottom surfaces of said block cases to cause said locking blocks to selectively engage and disengage the outer circumferential surface of said telescopic inner member.

8. The telescopic device of claim 5, further comprising an elastic member inserted between at least one block case and a respective locking block so as to enable the displacement of the locking block to be rapidly performed according to the operation of said telescopic lever.

9. The telescopic device of claim 5, wherein said locking blocks have one of a hexahedron shape and a circular shape in order to be able to provide the fixing force to the telescopic inner member, while being moved along said inclined bottom surfaces of said block case.

10. A telescopic device of a steering column for a vehicle, including a telescopic inner member is slidably mounted on a telescopic outer member and selectively fixable thereto by pivoting a telescopic lever, said telescopic device comprising:
   a plurality of block cases formed on said telescopic outer member, said block cases including inclined bottom surfaces;
   a plurality of locking blocks, each said locking block received in a respective one of said block cases formed on said telescopic outer member; and
   an actuating mechanism configured to interconnect said locking blocks such that said locking blocks are simultaneously movable toward and away from each other to selectively engage and disengage an outer circumferential surface of said telescopic inner member so that said telescopic inner member and said telescopic outer member are selectively locked and unlocked relative to one another,
   wherein said actuating mechanism comprises a connection rod that inter-connects said locking blocks, and a fastening member having a portion pivotally attached to one end of said connection rod and another portion is fixed to said telescopic lever, whereby operation of said telescopic lever causes said fastening member to move said locking blocks toward and away from one another to cause said locking blocks selectively engage and disengage from an outer circumferential surface of said telescopic inner member, and wherein said fastening member has a cam shape capable of varying a space between said locking blocks by moving said locking blocks in opposite directions according to a variation of contacting region between the curved outer circumferential surface of said fastening member and one of said locking blocks while said fastening member pivots synchronously with the pivot of said telescopic lever.

* * * * *